July 6, 1965　　　　　　G. M. RUSSELL　　　　　　3,193,637
PRECIPITATION DETECTOR
Filed April 1, 1963　　　　　　　　　　　　2 Sheets-Sheet 1
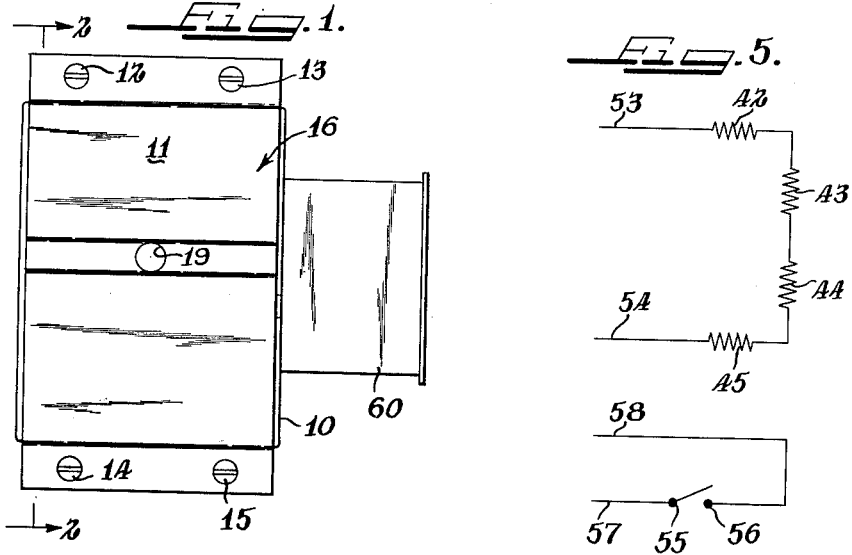
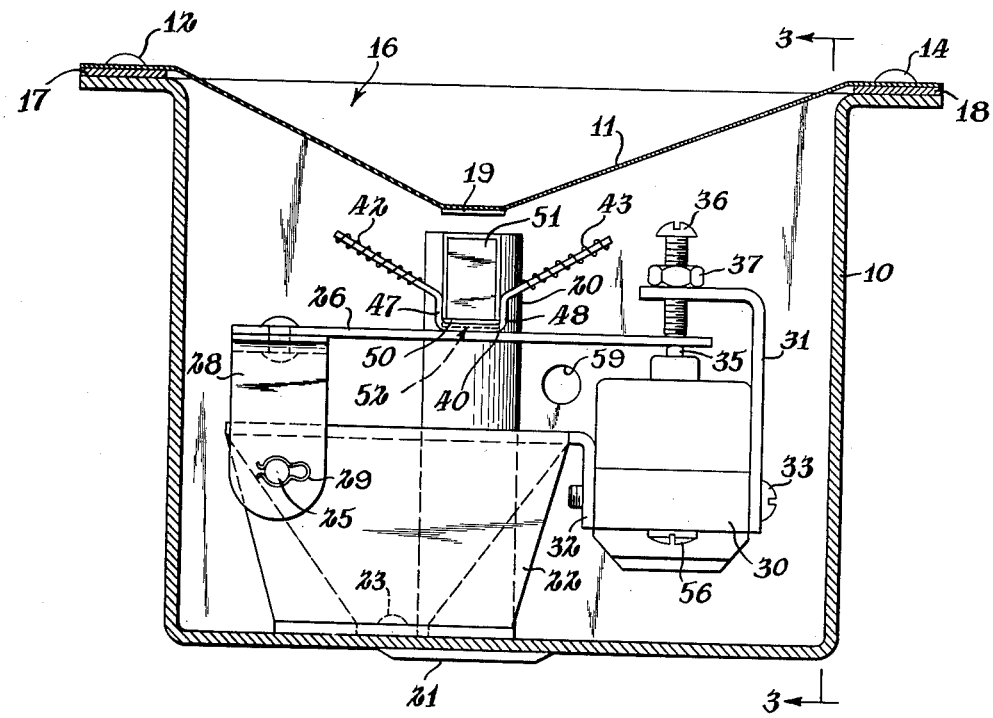
INVENTOR.
GROVER M. RUSSELL
BY Hofgren, Wegner,
Allen, Stellman & McCord
Attys.

July 6, 1965   G. M. RUSSELL   3,193,637

PRECIPITATION DETECTOR

Filed April 1, 1963   2 Sheets-Sheet 2

United States Patent Office 3,193,637
Patented July 6, 1965

3,193,637
PRECIPITATION DETECTOR
Grover M. Russell, Goshen, Ind., assignor to Penn Controls, Inc., a corporation of Indiana
Filed Apr. 1, 1963, Ser. No. 269,528
12 Claims. (Cl. 200—61.04)

The present invention relates to a precipitation detector and more particularly to a precipitation detector which will detect precipitation not only in the form of rain droplets but also in the form of sleet and snow.

Although a number of precipitation detectors have been devised in the past for detecting the presence of rain droplets, these have not been satisfactory for also reliably detecting the presence of precipitation either in the form of sleet or snow before the invention of Thomas E. Hayes described in the copending application, Serial No. 193,423. This application discloses a precipitation detector composed of a pair of bimetal elements in close proximity to each other with one exposed to falling precipitations of all forms such as rain, snow and sleet and the other one shielded from such exposure, a base of a switch connected to one bimetal element and an actuator of the switch in contact with the other bimetal element so that changes in ambient temperature will allow said base and said actuator to move substantially the same distances and in the same direction to prevent a switching action. When precipitation falls on the exposed bimetal element evaporation cooling occurs and the exposed element moves relative to the shielded bimetal element actuating the switch. When the falling precipitation ceases, precipitation remaining on the exposed bimetal element evaporates and upon the completion of the evaporation cooling ceases and the exposed bimetal element moves relative to the shielded bimetal element to deactivate the switch. It has been found that there are a number of applications for a precipitation detector wherein it is desired to deactivate the switch within an extremely short time period following the cessation of falling precipitation. It has also been found that there is a number of applications for a precipitation detector wherein it is desired to not deactivate the switch for a considerable period after the cessation of falling precipitation. This period is often as long as an hour. Since the structure disclosed in patent application 193,423 has an appreciable exposed area to falling precipitation, there is a short time lag between the cessation of falling precipitation and the deactivation of the switch. The present invention overcomes this difficulty by sheltering both binary elements from the falling precipitation and transferring to one of the binary elements a precipitation flow of which only a predetermined amount is allowed to be in contact with this one bimetal element at any given time. When this amount is kept fairly low, it will quickly evaporate as soon as no further precipitation is being received and transferred to it. When this amount is kept fairly high, it will require a substantial period of time to evaporate after the precipitation has ceased. Thus, the response time of the present invention upon the cessation of falling precipitation is greatly improved over a structure having an exposed bimetal element.

Thus, it is an object of the present invention to provide a new and improved precipitation detector.

A further object is to provide a precipitation detector having a pair of bimetal elements which are both sheltered by a structure with a means of transferring precipitation from outside the structure to one of the bimetal elements.

Another object is to provide a precipitation detector having a collecting receptacle in a top portion thereof, a shielded bimetal element and a means of transferring precipitation from the receptacle to the shielded bimetal element.

An additional object of the present invention is to provide a precipitation detector having a supporting structure shielding a pair of bimetal elements flexuously mounted in the structure below a precipitation collecting receptacle forming a top portion of the structure and a means for transferring precipitation from the receptacle to one of the bimetal elements.

Yet another object of the present invention is to provide a precipitation detector having a pair of bimetal elements, a switch having a base connected to one of the elements and an actuator in contact with the other element, and a reservoir with an overflow whose height predetermines the maximum amount of precipitation that can be retained in the reservoir at any given time mounted on one bimetal element.

Further objects and advantages will become apparent from the following detailed description taken in connection with the accompanying drawings.

In the drawings:

FIGURE 1 is a reduced top elevational view of an embodiment of the present invention;

FIGURE 2 is a sectional view taken along the lines 2—2 of FIGURE 1;

FIGURE 5 is a circuit diagram of the embodiment of the invention shown in FIGURES 1–4.

Figure 3:
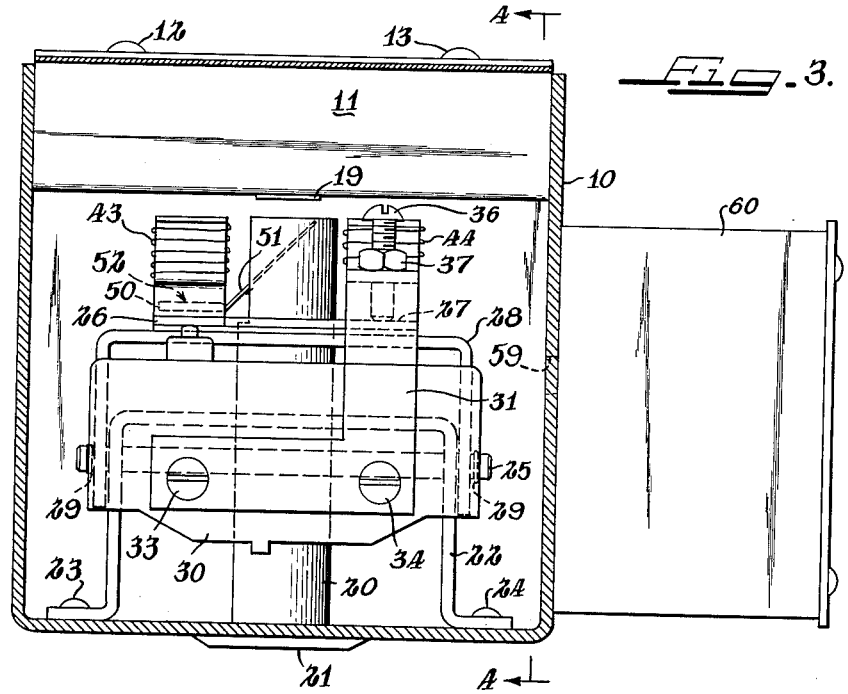
FIGURE 3 is a sectional view taken along the lines 3—3 of FIGURE 2.

While this invention is susceptible of embodiments in many different forms, there is shown in the drawings and will herein be described in detail an embodiment of the invention with the understanding that the present disclosure is to be considered as an exemplification of the principles of the invention and is not intended to limit the invention to the embodiment illustrated. The scope of the invention will be pointed out in the appended claims.

In addition to the disadvantage of having a substantially non-controllable lag time in a precipitation detector that had an exposed bimetal element, the bimetal element was subject to damage from outside objects impinging upon it including heavy sleet and to errors caused by wind. The present invention fully encloses all of the operating portions of the detector so that it can survive reasonably heavy blows, the punishment of heavy sleet, and variations of the wind.

Referring now to FIGURES 1–4, a supporting structure is composed of a housing 10 and a top portion 11 secured to the housing 10 by a set of screws 12–15 which also secure a pair of insulating strips 17 and 18 in place between the housing 10 and the top 11. The top 11 is shaped to form the bottom of a precipitation receptacle generally indicated at 16 with an aperture 19 in the lowest portion thereof. Mounted inside the support structure and secured thereto is a duct 20 which is adapted to carry off a considerable portion of the precipitation which collects in the receptacle 16 by having an upper end located directly below the aperture 19 of the receptacle bottom 11 and having another end placed to discharge precipitation through an aperture 21 in the bottom of the housing 10. Referring specifically to FIGURE 3, the precipitation which passes between the support structure top which is the receptacle bottom 11 and the side of the housing 10 will drain down to the bottom of housing 10 and be discharged through the aperture 21 along with the precipitation which drains down through the duct 20 from the aperture 19 of the receptacle bottom 11.

Figure 4:
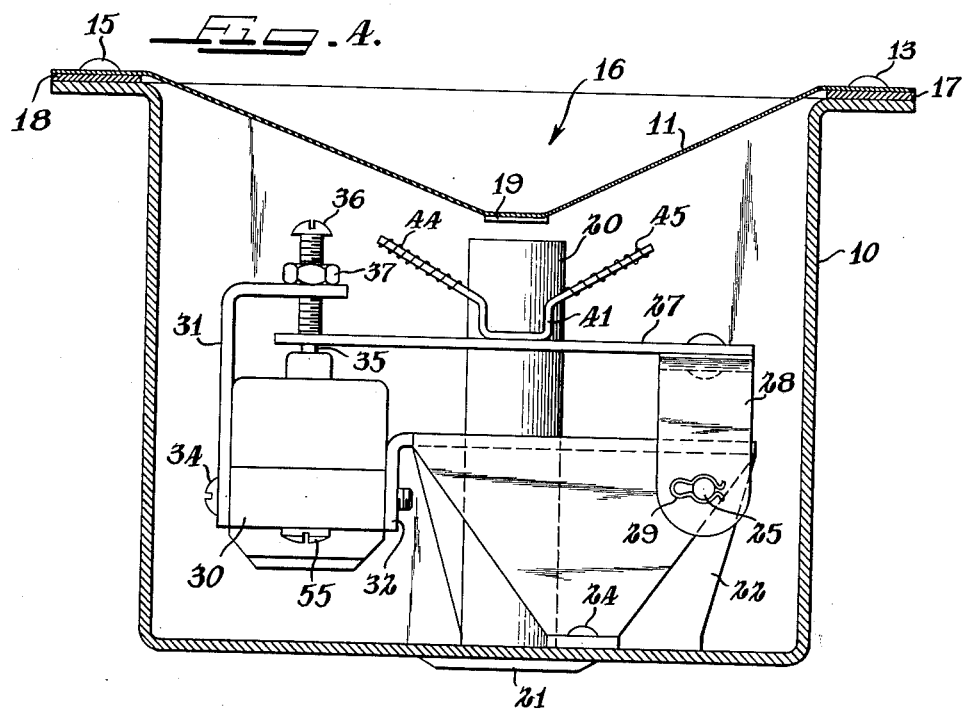
FIGURE 4 is a sectional elevational view taken along the lines 4—4 of FIGURE 3.

Referring to the FIGURES 2–4, a bracket 22 is mounted in the housing 10 by a pair of screws 23 and 24 to support the duct 20 and a shaft 25.

A pair of bimetal elements in the form of flat arms 26 and 27 are riveted to a bimetal mounting bracket 28 which is rotatably mounted on shaft 25. A pair of spring clips 29 hold the shaft 25 against excessive axial movement. A conventional positive action switch such as a "Penn" switch is rigidly secured relative to the housing 10 by having a base 30 mounted between a set screw mounting bracket 31 and a flange 32 of the bracket 22 by a pair of screws 33 and 34. The switch has an actuator 35 in the form of a spring loader plunger extending out of its base 30 to engage the arm 26. A set screw 36 having a locking nut 37 is threaded into the bracket 31 to engage the bimetal element 27.

Mounted on the arms 26 and 27 are a pair of heater brackets 40 and 41, respectively, to support four electrical resistant heaters in the form of high-resistant wire 42–45.

Vertical portions 47 and 48 of the heater mounting bracket 40 together with an overflow 50 in the form of a lip portion and a slide 51 form a reservoir generally indicated at 52. The slide 51 is positioned below the aperture 19 so that when precipitation is falling a quantity of it will pass through the aperture 19, be caught by the slide 51 to transfer it to the reservoir 52. Whenever the reservoir 52 is filled to a predetermined quantity, any excessive precipitation is disposed of by the overflow 50 which allows it to spill over into the bottom of the housing 10 and drain out through the aperture 21.

Referring now to FIGURE 5, four electrical resistant heaters 42–45 are connected in series between a pair of leads 53 and 54, a terminal 55 and a terminal 56 of a positive action switch are connected to a pair of leads 57 and 58, respectively. The leads 53 and 54, the series connections between the heaters 42–45 and the leads 57 and 58 are not shown in FIGURES 2–4. They are connected as indicated in FIGURE 5 and led out through an aperture 59 in the housing 10 into a conventional electrical junction box 60 which is secured to the housing 10 as shown in FIGURES 1 and 3. A source of potential is connected to leads 53 and 54 at the junction box 60. The leads 57 and 58 are connected at the junction box to any desired actuator or indicator which is to be operated by the positive action switch.

Referring to the drawings, the operation of the illustrated embodiment of the invention will now be described in greater detail. The set screw 36 is adjusted against the bimetal element 27 until the bimetal element 27 just engages the actuator 35 of the switch. The lock nut 37 is then positioned to prevent accidental rotation of the screw 36. With this adjustment, any downward movement of the arm 26 against the actuator 35 would tend to rotate the bracket 28 counterclockwise as shown in FIGURE 2 and to bring the unsecured end of bimetal element 27 upward against the set screws 36. However, since such upward movement of the bimetal element 27 is constrained by the end of the screw 36, the arm 27 must force the actuator 35 to move downward whenever the force of the arm exceeds the force of the spring loaded actuator. Thus a bowing of the arm 26, so that its unsecured end moves downwardly without a similar bowing of the arm 27, results in a downward movement of the actuator 35 until the switch is actuated. An actuation of the switch normally results in a closed circuit between the terminals 55 and 56. However, for certain desired applications, the switch may be constructed so that the circuit between the terminals 55 and 56 are opened rather than closed.

When the bimetal elements 26 and 27 are cooled, their center portions will bow upwardly and conversely, as they are heated, their center portions will bow in a downward direction. As long as both bimetal elements are maintained at approximately the same temperature, there will be no relative movement between their unsecured ends, and, therefore, their temperature may vary over a wide range without the switch being actuated. However, as soon as precipitation falls into the receptacle 16 and a portion runs down into the reservoir 52, the bimetal element 26 will commence to be cooled by evaporation which will force its center to bow forcing its unsecured end to move downwardly actuating the switch. Thus, the present invention may be utilized as a precipitation detector without energizing the four-resistance heaters 42–45 in mild or warm climates.

The heaters 42–45 make it possible to increase the response time of precipitation cessation and to provide for efficient operation where precipitation is falling in a solid form of sleet or snow. In a normal operation, the heaters raise the temperature of both bimetal elements 26 and 27 to approximately 150°. This temperature is not critical, and, as mentioned before, can often be maintained at the ambient atmospheric temperature without energization of the heaters. In some applications where extremely rapid response is desired, temperatures higher than 150° may be utilized. The exact temperature of the bimetal elements 26 and 27 at any given time will be the result of the heat being transferred to them from the heaters and the temperature being lost to the support structure and the outside atmosphere. Thus, the exact temperature of the bimetal elements at any given moment is related to the atmospheric temperature and is varied as it varies. When precipitation starts falling, it is collected in receptacle 16 which is kept sufficiently above the freezing temperature of water by the proximity of the heaters 42–45 below the receptacle bottom 11. If precipitation is the solid form of snow or ice, it is quickly melted and runs down through the aperture 19. The slide 51 is so positioned below the aperture that if a relatively small quantity of precipitation runs down from the aperture 19, most of it will be transferred to the reservoir 52. However, if the rate of precipitation increases markedly, a large excess of precipitation will flow around the slide 51 and directly down the duct 20 and out through the aperture 21 of the housing 10. When the reservoir 50 is relatively small, even a small amount of precipitation collected by the receptacle 16 and transferred by the slide 51 will quickly fill the reservoir. If the reservoir is relatively large, a larger amount of precipitation will be required to fill the reservoir and a longer time will be required to fill it. The reservoir being mounted directly on the bimetal element 26, will cause evaporation at a rate proportional to the temperature of the bimetal which is controlled by the heaters 42 and 43. As evaporation starts to occur, the reservoir and the bimetal element 26 is cooled so that the free end of the bimetal 26, engaging actuator 35, moves downwardly. Since the bimetal 27 is not affected by this evaporation cooling, it maintains its form and maintains the bracket 28 stationary by engaging set screw 36. Since, the bracket 28 remains stationary, the downward bending of the free end of the arm forces actuator 35 downward, actuating the switch.

The height of the overflow 50 determines the maximum amount of precipitation that can be held in the reservoir at any given moment. When this maximum amount is kept relatively low, the amount of time required for this quantity to be evaporated as soon as no further precipitation is being transferred to it by slide 51, is relatively rapid. Assuming that heavy precipitation has been falling and suddenly stops, the amount of water at that moment in the reservoir will be the same as it would be if a very light precipitation had been falling and had gradually stopped. Thus, in both extremes, the response to the stopping of the precipitation is rapid, for as soon as the small quantity of precipitation in the reservoir is evaporated, the heaters 42 and 43 quickly raise the bimetal element 26 to approximately the same temperature as bimetal element 27, so that it has the same amount of bending as the element 27 and the spring-loaded actuator 35 is allowed to move upwardly deactivating the switch.

When the maximum amount is increased by making the height of the overflow 50 higher, the amount of time required for this increased quantity to be evaporated, after precipitation ceases and is not being transferred by slide 51, is proportionally increased. The height of overflow 50 may be raised until the time period between the cessation of precipitation and the evaporation of water from the reservoir is of the order of an hour or more. Thus, varying the height of the overflow 50 controls the predetermined lag in the actuation of switch 30 after the cessation of precipitation. Longer lags are desirable where the detector is being used to control a melting system in snowfall areas in order that the snow has sufficient time to melt off walks and roads equipped with the melting system.

It will be readily noted by those skilled in the art that the exact positioning of the heaters, the material utilized in the support structure, the capacity of the reservoir, and the material and dimensions of the bimetal elements are all important factors in determining the response time of the detector. All variations of such parameters are within the scope of the present invention and may be varied to obtain specific response characteristics desired or required for various specialized situations.

I claim:

1. A precipitation detector comprising: a mounting member, a pair of sheltered temperature sensitive elements, each of said elements having a first portion rigidly fixed relative to the first portion of the other element and having a second portion free to move relative to the first portion a switch having a base fixed relative to the second portion of one of said elements and having an actuator in contact with the second portion of the other said element, a precipitation collecting means, and means for transferring precipitation from said collecting means to one of said pair of sheltered temperature sensitive elements.

2. In combination with the precipitation detector of claim 1, a heating means mounted in close proximity to said temperature sensitive elements.

3. A precipitation detector as specified in claim 2, wherein said heating means comprises an electrical resistance heater mounted on each said temperature sensitive elements.

4. In combination with the precipitation detector of claim 1, a heating means mounted in close proximity to said precipitation collecting means to melt solid forms of precipitation collecting therein.

5. A precipitation detector comprising: a support structure, a precipitation receptacle forming a portion of said structure and having an aperture therein, means for indicating initial precipitation on said structure, said means including a precipitation responsive element sheltered by said structure, said precipitation responsive element indicating the initial presence of precipitation thereon, and means mounted on said structure for transferring precipitation from said receptacle to said precipitation responsive element.

6. In combination with the precipitation detector of claim 5, a heating means mounted in close proximity to said precipitation receptacle to melt solid forms of precipitation collecting therein.

7. A precipitation detector as specified in claim 5, wherein said structure includes a duct cooperating with said aperture to carry out of said structure precepitation not transferred to said precipitation sensitive element.

8. A precipitation detector as specified in claim 5, wherein precipitation responsive element includes a reservoir with an overflow.

9. A precipitation detector as specified in claim 8, wherein said transferring means comprises a slide mounted under said aperture and terminating at said reservoir.

10. A precipitation detector comprising: a support structure, a precipitation receptacle forming a portion of said structure, a mounting member, a pair of sheltered bimetal elements flexuously mounted in said structure each said element having a first portion rigidly fixed relative to the other first portion and having a second portion free to move relative to the first portion, an electrical resistance heater mounted on each bimetal element in close proximity to said receptacle, a switch having a base cooperatively connected to the second portion of one of said elements and having an actuator cooperatively engageable with the second portion of the other said element; and a means mounted on said structure for cooling one of the bimetal elements when precipitation is being received in said receptacle.

11. A precipitation detector as specified in claim 10, wherein said cooling means comprises a means for transferring precipitation from said receptacle to said one bimetal element.

12. A precipitation detector comprising: a support structure, a precipitation receptacle forming a top portion of said structure a mounting bracket, a pair of bimetal elements flexuously mounted in said structure below said receptacle and sheltered by said structure, each said element having a first portion rigidly fixed relative to the other first portion and having a second portion free to move relative to the first portion, an electrical resistance heater mounted on top of each bimetal element, a switch having a base fixed relative to the second portion of one of said elements and having an actuator in contact with the second portion of the other said element, a reservoir mounted on one bimetal element and having an overflow, and an aperture in said receptacle adapted to transfer precipitation to said reservoir.

References Cited by the Examiner

UNITED STATES PATENTS

| | | |
|---|---|---|
| 1,287,188 | 12/18 | Beck _____ 200—138 |
| 1,945,100 | 1/34 | Troll. |
| 2,610,273 | 9/52 | Judson _____ 200—138 X |
| 2,915,898 | 12/59 | Van Luik _____ 73—77 X |
| 2,922,981 | 1/60 | Anderson _____ 340—235 X |
| 2,954,690 | 10/60 | Dickinson _____ 73—171 |

ROBERT K. SCHAEFER, *Primary Examiner.*

J. P. STRIZAK, *Examiner.*